(12) United States Patent
Hedlund et al.

(10) Patent No.: US 6,978,852 B2
(45) Date of Patent: Dec. 27, 2005

(54) ROCK DRILL PRODUCT AND METHOD

(75) Inventors: Ann-Cathrin Hedlund, Sandviken (SE); Göran Hagelin, Sandviken (SE); Agne Lundquist, Järbo (SE)

(73) Assignee: Sandvik AB, Sandviken (CH)

( * ) Notice: Subject to any disclaimer, the term of this patent is extended or adjusted under 35 U.S.C. 154(b) by 63 days.

(21) Appl. No.: 10/439,182

(22) Filed: May 16, 2003

(65) Prior Publication Data

US 2003/0230433 A1    Dec. 18, 2003

(30) Foreign Application Priority Data

May 17, 2002  (SE) ................................. 0201487

(51) Int. Cl.⁷ .............................................. E21B 7/00
(52) U.S. Cl. ...................................... 175/320; 411/389
(58) Field of Search .................. 175/320; 470/17; 411/389, 411

(56) References Cited

U.S. PATENT DOCUMENTS 3,547,715 A    12/1970 Rossander
5,700,120 A  * 12/1997 Manning et al. ............ 411/389

FOREIGN PATENT DOCUMENTS

WO           01/38685 A1    5/2001

* cited by examiner

*Primary Examiner*—William Neuder
(74) *Attorney, Agent, or Firm*—Drinker Biddle & Reath LLP

(57) ABSTRACT

A threaded rock drill element for percussive rock drilling includes a body forming a center axis and having a hardened thread. The thread includes thread crests and thread bottoms and a hardened zone having increased hardness. The hardened zone includes first and second hardened areas extending radially from a crest and bottom (valley), respectively, of the thread, to a boundary curve of the hardened zone. The boundary curve has convex portions extending along the thread crests, and concave portions extending along the thread bottoms.

11 Claims, 3 Drawing Sheets

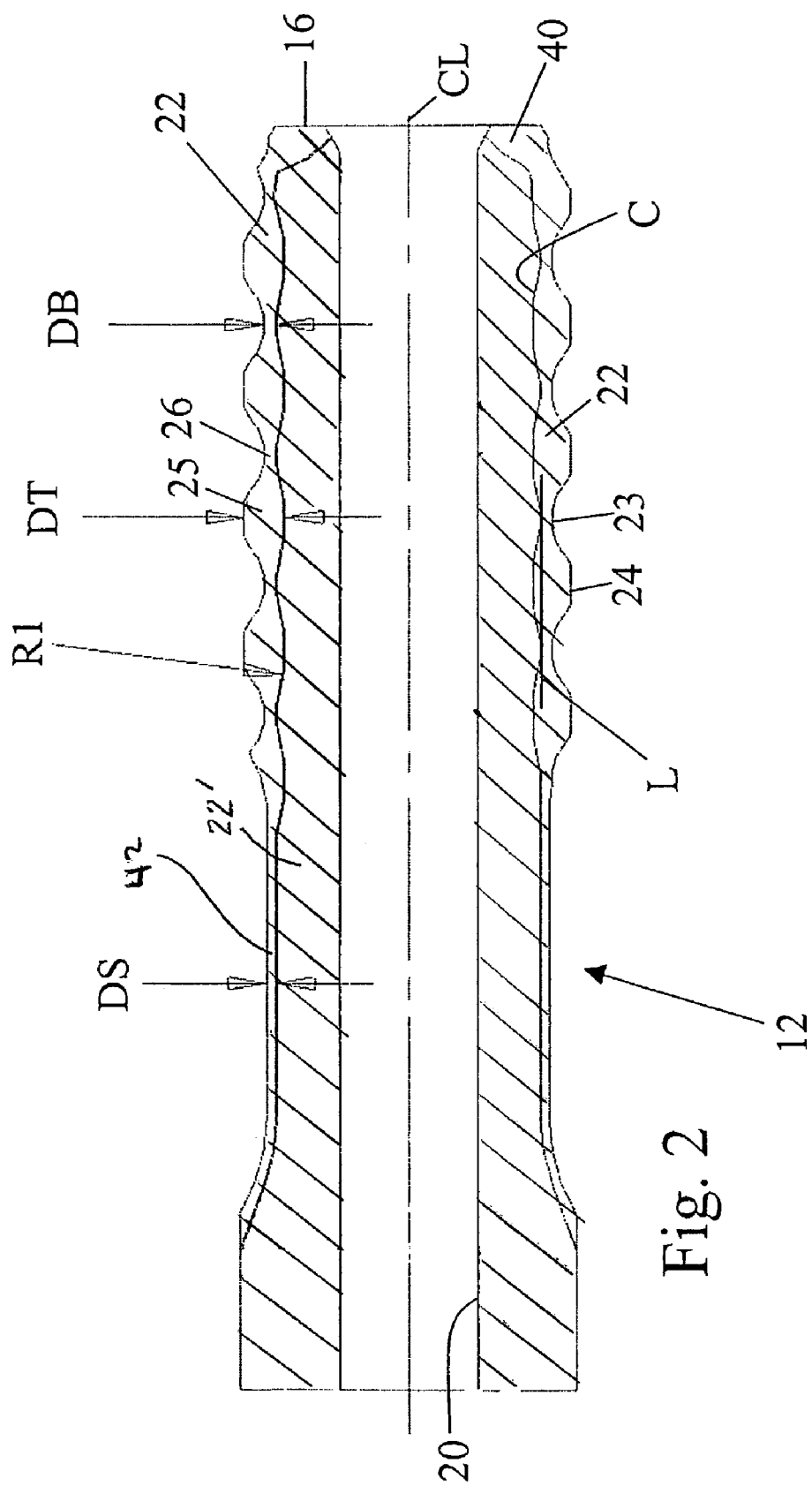

ROCK DRILL PRODUCT AND METHOD

This application claims priority under 35 U.S.C. §§119 and/or 365 to Patent Application Serial No. 0201487-6 filed in Sweden on May 17, 2002, the entire content of which is hereby incorporated by reference.

BACKGROUND OF THE INVENTION

The present invention relates to a rock drill product (element) and a method for the hardening of the product.

PRIOR ART

At percussive rock drilling, the drilling elements, i.e., bits, rods, tubes, sleeves and shank adaptors, are exposed to abrasive and mechanical attacks. Fatigue breakages are especially serious in the most strained parts, i.e., thread bottoms and reductions. In interaction with pulsating loads, caused by impact waves and bending loads, fatigue arises. This is a common reason for breakages on the drilling element. Case-hardening of the elements causes compressive stresses in the surface, providing a certain beneficial effect upon the fatigue, but the method has so far not been optimized.

A known way to harden a rock drill product is so-called "single shot", hardening as disclosed for instance in Rossander U.S. Pat. No. 3,547,715. The disadvantage of the known technique is that individual control of the hardening process is lacking since the entire surface is heated simultaneously. Furthermore, there is a limit for how large a product a certain equipment is capable of hardening.

OBJECTS OF THE INVENTION

An object of the present invention is to provide a rock drill product and a method for the hardening of the product in order to avoid the limitations of the prior art technique.

Another object of the present invention is to provide a rock drill product having a substantially improved resistance to fatigue in sections with reduced cross-section in a drilling element for percussive rock drilling.

SUMMARY OF THE INVENTION

The objects of the invention are realized by a threaded rock drill element for percussive rock drilling which includes a body defining a longitudinal center axis and including a thread arranged coaxially with the axis. The thread comprises thread crests alternating with thread bottoms. The element includes a hardened zone comprised of first and second hardened areas. Each first hardened area extends radially from a thread crest, and each second hardened area extends radially from a thread bottom. The first and second hardened areas extend radially to a boundary curve extending between the hardened zone and a non-hardened zone. Portions of the curve extending along the first hardened areas are convex with reference to the non-hardened zone and portions of the curve extending along the second hardened areas are concave with reference to the non-hardened zone.

The invention also relates to a method for hardening a threaded rock drill element for percussive rock drilling. The element includes a body defining a longitudinal center axis and a thread arranged coaxially with the axis. The thread comprises thread crests alternating with thread bottoms. The element includes a hardened zone comprised of first and second hardened areas. Each first hardened area extends radially from a thread crest, and each second hardened area extends radially from a thread bottom. The method comprises the steps of:

a) positioning a heat source at a distance from the axis;

b) simultaneously affecting relative rotational movement between the element and the heat source about the axis, and relative axial movement between the element and the heat source while activating the heat source to heat the element; and c) cooling heated portions of the element.

BRIEF DESCRIPTION OF THE DRAWINGS

Below, preferred embodiments of the invention will be disclosed, reference being made to the accompanying drawing, wherein

FIG. 2 shows a rock drill product according to the present invention in longitudinal section.

DESCRIPTION OF PREFERRED EMBODIMENTS OF THE INVENTION

One aspect of the present invention relates to a method for quickly giving a rock drill product 12, 12', 13 increased hardness by means of induction hardening, i.e. increased wear resistance and/or increased strength. It is the surface, or a part of the surface, of the rock drill product that is hardened. The rock drill product is manufactured from steel containing carbon, usually in the range of 0.3–0.5%. Electric currents being induced therein heat the rock drill product. Primarily due to the resistive resistance in the material, heat arises, a usual temperature level being approx. 900° C. At this temperature, the carbon atoms dissolve in the iron structure. The character of the heating zone is determined by the heating tool, the so-called induction coil 50. Directly after the heating, the rock drill product needs to be quickly cooled down, i.e. quenched, to approx. 100° C. This is carried out by means of flushing nozzles arranged in, or adjacent to, the induction coil 50, directed downwardly with a jet angle of 15–45°. The jets are shown schematically in FIGS. 1 and 3. Then the carbon atoms are retained in the structure as an interstitial solution. The result is that the structure is decomposed, martensite has been formed and the product becomes hard in the hardened zone 22. Higher effect gives higher temperature, as well as a somewhat greater case depth. Longer heating time gives a greater case depth, as well as a somewhat higher temperature.

Figure 3:
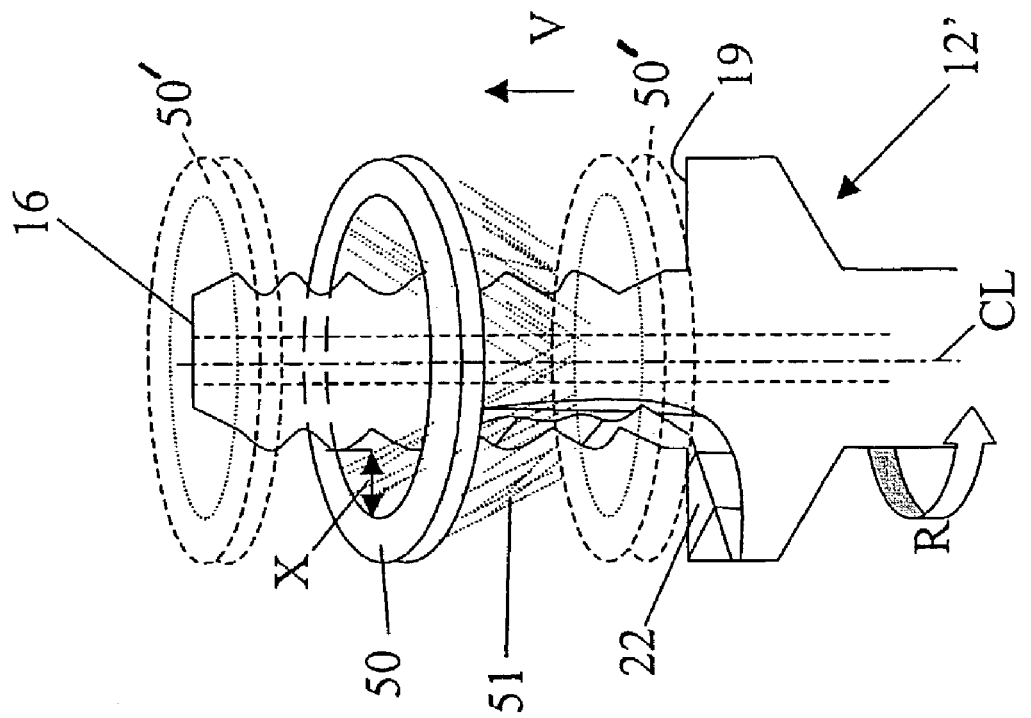
FIG. 3 shows a view of an alternative rock drill product and a source of heat partly in section.
Figure 1:
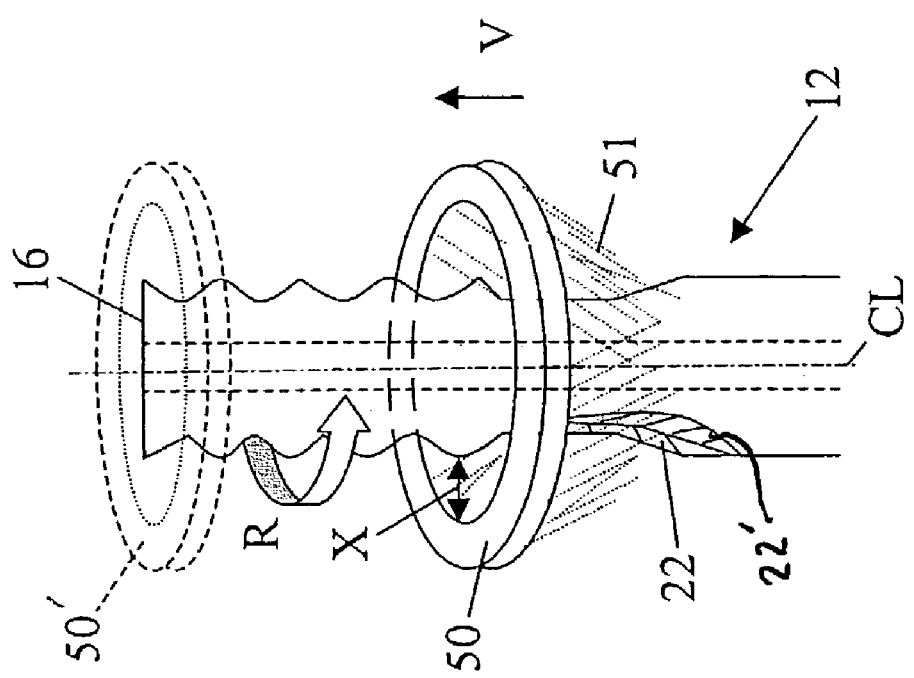
FIG. 1 shows a view of a rock drill product and a source of heat partly in section.

Progressive hardening results because the induction coil 50 or the rock drill product is fed with a certain axial speed V (shown as an arrow V) and a relative rotation R during the hardening process. In FIGS. 1 and 3, it is purely schematically shown how progressive hardening is utilized in the present invention for the hardening of the rock drill product 12 for percussive rock drilling. The hardening zone 22 is provided by means of heating via a source of heat such as the induction coil 50 as well as cooling by the following steps: adapt the induction coil in relation to the center line CL of the rock drill product, so that a distance X between the thread crest and the coil is in the interval of 2–4 mm, rotate the rock drill product in the direction R, maintain a constant distance between the induction coil and the center line CL of the rock drill product, move the induction coil in the axial direction in relation to the rock drill product 12, 12' with a speed V, the speed V being 3–6 mm/s, preferably 3.5–4.5 mm/s and most preferably about 4 mm/s, cool the rock drill product continuously with substantially the same speed V (by a fluid from the nozzles that move relative to the rock drill product at the speed V), so that the formed hardening zone follows a boundary curve C, which is both convex (having a radius R1), and concave. The curve C runs along a soft zone serving as a border separating the outer hardened steel 22 from the inner unhardened steel 22'.

Hardening a hollow rock drill product comprising a radial stop face 16 and/or a flange 19, as is shown in FIG. 3, where also a part of the stop face or the flange is to be hardened, involves at least one additional step. This additional step consists of a stationary preheating of the portion in question while producing simultaneous rotation of the rock drill product relative to the coil 50, prior to the relative axial movement at the speed V. Dashed circles 50' in FIGS. 1 and 3 illustrate the stationary positions of the coil during preheating. In the case according to FIG. 1, preheating of the surface 16 takes place, and then the coil 50 is brought down to the largest diameter of the rod in order to then be moved in the axial direction of the arrow V during simultaneous rotation of the rock drill product. In the case according to FIG. 3, preheating of the surface 16 takes place, and then the coil 50 is brought down nearby the shoulder for preheating of the stop face 19 thereof and to then be moved in the direction of the arrow V during simultaneous rotation of the rock drill product.

Figure 4:
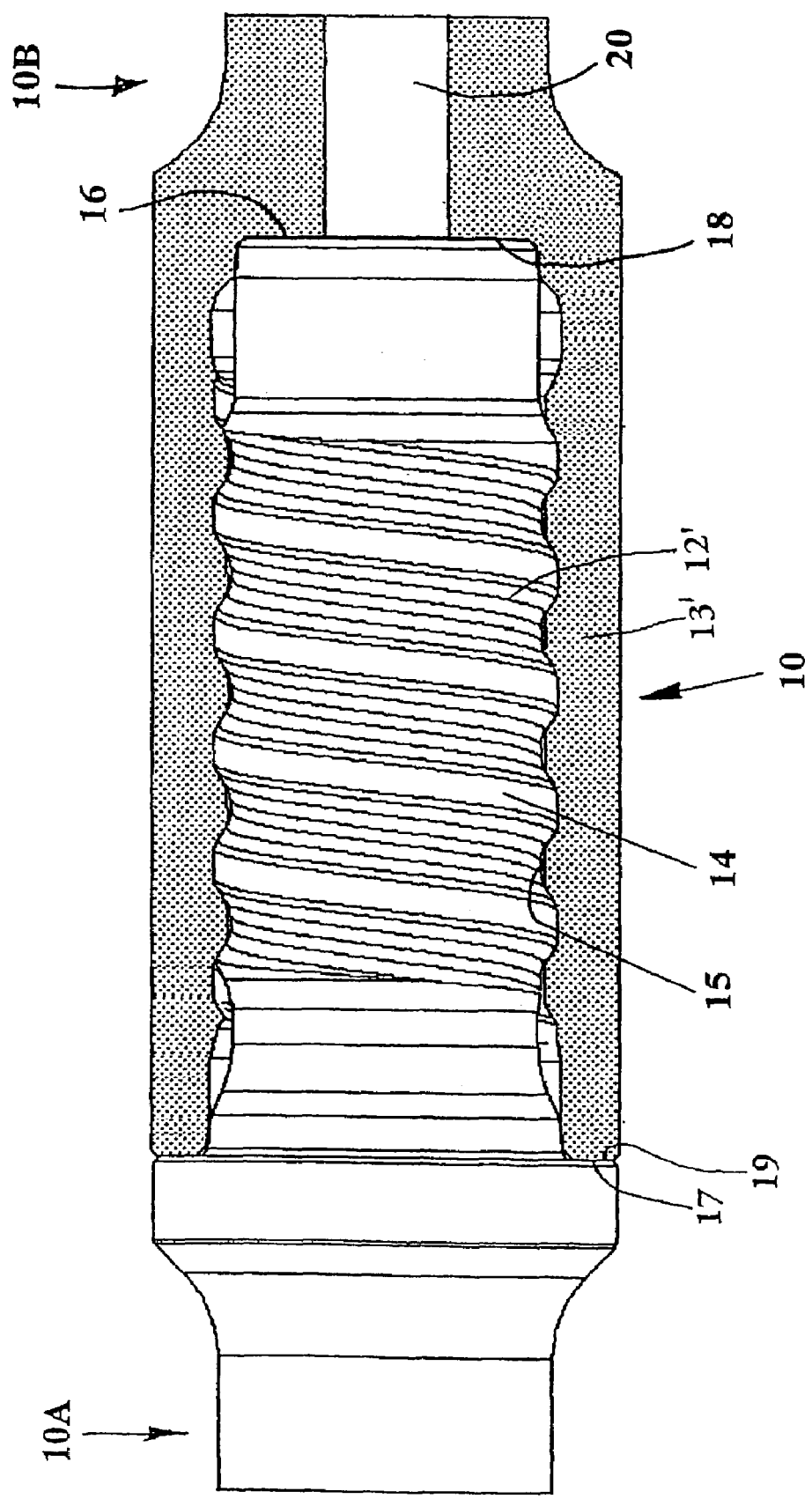
FIG. 4 shows a threaded joint, partly in longitudinal section, comprising alternative rock drill products according to the present invention.

A threaded joint 10 for percussive top hammer drilling is shown in FIG. 4. The threaded joint consists of rock drilling elements such as two drill tubes or drill rods 10A, 10B, each one comprising rock drill products such as an end having a projecting spigot or male part 12', as well as an end having a sleeve or female part 13'. Said product has a center line CL. The spigot 12' constitutes an integrated part of the drill rod, usually by means of friction welding after machining and heat treatment. The spigot has a substantially cylindrical external thread 14 and the sleeve has a substantially cylindrical internal thread 15. Each of the threads 14, 15 preferably has only one entrance and one exit. When the threaded joint 10 that is shown in FIG. 4 having two drill rods 10A, 10B is established, the male part enters the female part. In most cases, the bars have to be rotated relatively during compression so that the threads can come into engagement with each other. Then, the bars may be additionally rotated until the free end surface 16 of the rod abuts against a bottom 18 in the female part and/or the stop face 17 abuts against an inner shoulder 19 around the inner end of the spigot 12'. All of the surfaces 16–19 have been exposed to preheating in connection with the hardening method according to the present invention. The threads 14 and 15 are conventionally formed so that abutment arises only between certain flank portions of the respective male and female parts when they have been tightened. In Swedish Patent No. 516,874, which patent is hereby incorporated by reference in the present disclosure, rock drill products are disclosed in which the present invention may be utilized. The female part 13 constitutes an integrated part of the drill rod, usually by means of friction welding after machining and heat treatment. Furthermore, the drill rod has a through-going flush duct 20, through which a flush medium, usually air and/or water, is led.

The thread 14 will now be disclosed in closer connection with FIG. 2, which shows a rod end without shoulder 19.

The thread has thread crests 24 and thread bottoms 23, both of which being arranged in a hardening zone 22 of increased hardness. A first hardened area 25 is defined in a radial cross-section comprising a thread crest 24, and a second hardened area 26 is defined in a radial cross-section comprising a thread bottom 23. The first and second hardened areas thus extend radially from thread crests and thread bottoms, respectively, to a boundary curve C. The hardening zone 22 follows the curve C that is convex along the first hardened area 25, and that is concave along the second hardened area 26.

The expressions concave and convex as used herein are considered with reference to the non-hardened region 22, i.e., the curvature is viewed from the non-hardened region. An imaginary line L, which is parallel to the center line CL, and tangent to at least two of the concave portions of the curve C situated adjacent to each other, passes through the first hardened area 25. The first hardened area 25 has a first maximum radial case depth DT, and the second hardened area 26 has a second maximum radial case depth DB. The ratio of the first maximum case depth DT to the second maximum case depth DB is within the interval 2–4, preferably 2.5–3.5. The rock drill product comprises a stop face 16 at least on one axial end of the thread 14, the stop face being arranged to transfer compressive pulses from a conventional percussive equipment for percussive drilling. The stop face 16 has been exposed to preheating in connection with the hardening method according to the present invention. The rock drill product comprises an end portion 40 extending axially beyond the thread 14 having a smaller radial thickness of material than of the thread, the portion 40 having substantially the same maximum case depth as the second hardened area 26 and the curve C is substantially convex at said portion 40 with reference to the non-hardened zone. In order to decrease crack formation, the flush duct 20 is not hardened. A run-out 42 beyond the thread is preferably hardened in a way so that the same obtains a relatively small case depth DS, approximately like DB.

The rock drill product 13' comprises an internal thread 15 made in a sleeve provided with an internal stop face 18 and an external stop face 17. The internal thread 15 and the surfaces 17, 18 are hardened in the same way as has been described in connection with FIG. 3, with two preheatings. However, an induction coil that is smaller in diameter than the coil 50 is used to heat the interior of the sleeve, and the flushing medium is evacuated from within the sleeve via the flush duct 20.

Here, the expression "threaded rock drill product" means drill tubes or drill rods, shank adapters, a loose coupling sleeve or spigots or sleeves friction welded to a tube or a hollow bar.

The entire thread is preferably made from low-alloy steel, including the thread bottom. If cracks spread within the area of DB or DS, the soft zone C will constitute a brake against further propagation resulting in fatigue failure taking place later. By means of the method according to the present invention, rock drill products having a variety of different geometries can be hardened in one and the same equipment, under good control of the hardening process.

Although the present invention has been described in connection with preferred embodiments thereof, it will be appreciated by those skilled in the art that additions, modifications, deletions and substitutions not specifically described may be made without departing from the spirit and scope of the invention as defined in the appended claims.

What is claimed is:

1. A threaded rock drill element for percussive rock drilling; the element including a body defining a longitudinal center axis and including a thread arranged coaxially with the axis the thread comprising thread crests alternating with thread bottoms; the element including a hardened zone comprised of first and second hardened areas; each first hardened area extending radially from a thread crest, and each second hardened area extending radially from a thread bottom; wherein a boundary curve extends between the hardened zone and a non-hardened zone with portions of the curve extending along the first hardened areas being convex with reference to the non-hardened zone, and portions of the curve extending along the second hardened areas being concave with reference to the non-hardened zone.

2. The threaded rock drill element according to claim 1 wherein an imaginary line extending parallel to the axis and tangent to at least two adjacent concave portions of the curve passes through the first hardened areas.

3. The threaded rock drill element according to claim 1 wherein the first and second hardened areas have first and second maximum radial case depths, respectively; a ratio of the first maximum radial case depth to the second maximum radial case depth is in the range of 2–4.

4. The threaded rock drill element according to claim 3, wherein the range is 2.5–3.5.

5. The threaded rock drill element according to claim 3 wherein the body further includes a radial stop face disposed adjacent at least one longitudinal end of the thread.

6. The threaded rock drill element according to claim 3 wherein the body further includes an end portion extending axially beyond the thread and having a smaller radial thickness than the thread; a portion of the boundary curve extending along the end portion being generally convex with reference to the non-hardened zone.

7. The threaded rock drill element according to claim 1 wherein the body includes an axially extending flush duct.

8. The threaded rock drill element according to claim 7 wherein the flush duct is non-hardened.

9. The threaded rock drill element according to claim 1 wherein the body comprises a spigot and the thread constitutes an external thread, the spigot including a radial shoulder extending radially beyond the thread and forming a contact surface facing generally axially toward the thread.

10. The threaded rock drill element according to claim 1 wherein the body comprises a sleeve, and the thread constitutes an internal thread, the sleeve including a stop face extending radially inwardly of the thread and facing generally axially away from the thread.

11. The threaded rock drill element according to claim 1 wherein the body is friction welded to another portion of the element.

* * * * *